Figure 3:
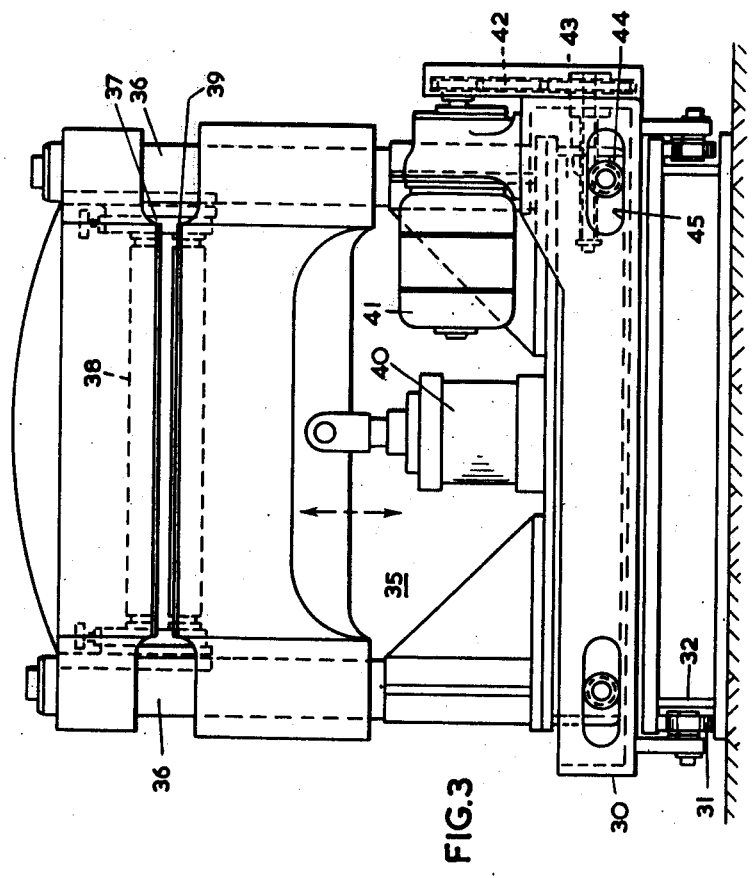

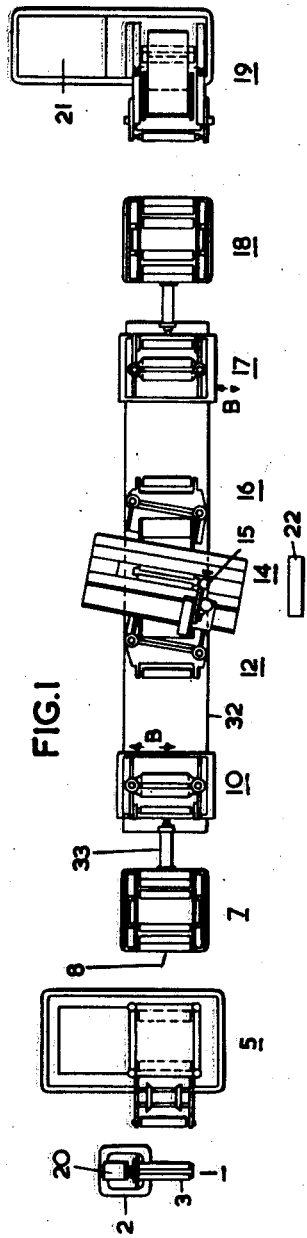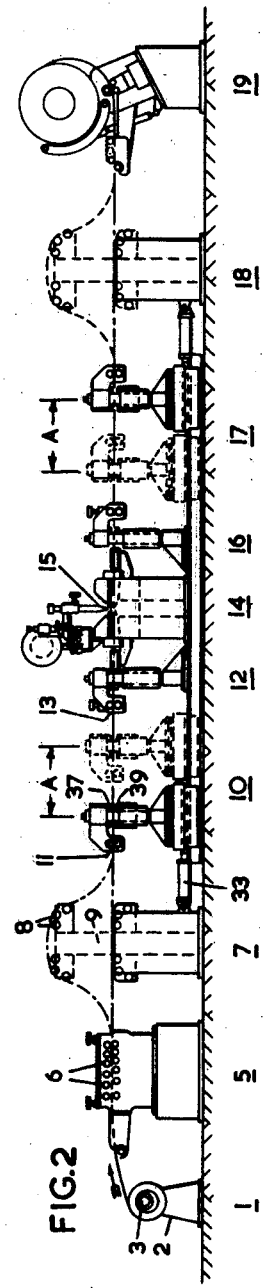

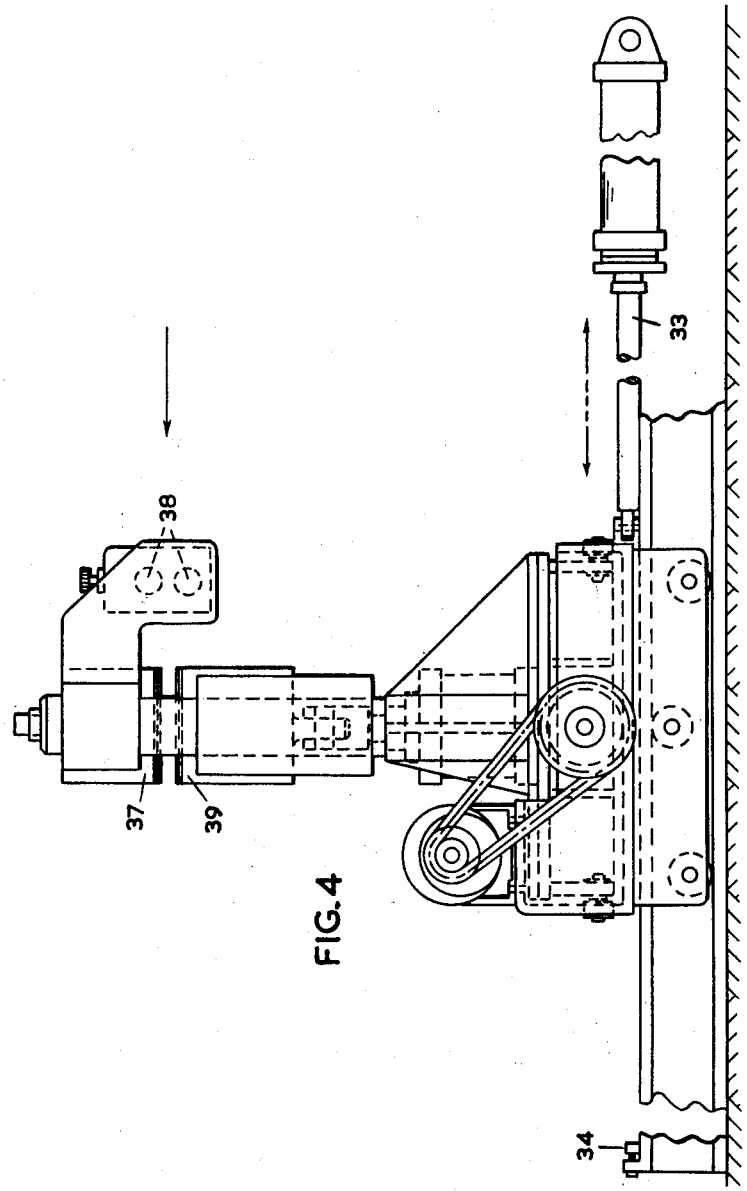

United States Patent Office 3,191,843
Patented June 29, 1965

3,191,843
METHOD AND APPARATUS FOR THE MANUFACTURE OF METAL STRIP
Alan G. Tomkins, Gosforth, Newcastle-upon-Tyne, England, assignor to The British Oxygen Company Limited, a British company
Filed May 23, 1961, Ser. No. 111,997
Claims priority, application Great Britain, May 31, 1960, 19,305/60
2 Claims. (Cl. 228—5)

This invention relates to methods and apparatus for the manufacture of metal strip. When produced by hot-rolling and/or cold rolling methods from metal billets, metal strips up to ¼ inch in thickness and of limited length are normally stored on coils. A great increase in the productive efficiency of any further rolling operation or mass-production use of the metal strip may be obtained by joining such coils of metal strip end-to-end to form a coil bearing a much greater quantity of strip. This greater efficiency arises chiefly because of the greater utilization of expensive continuous-process plant.

It is an obeject of the present invention to provide an improved method and apparatus for joining metal strip by welding.

The conventional method of joining the ends of two coils of metal strip by welding is to feed the two ends by means of pinch rolls horizontally towards each other with the strips flat and in the same plane along supporting rollers and between side guides, clamp each end at a cutting position, crop each end with a shear blade, and then feed each end of the strip forward to a welding position at which a welding head, which may be an automatic electric arc welding head, makes a traverse of the strips along the line of join and weld them together. For the successful employment of any automatic arc welding process and also for satisfactory flash-butt resistance welding it is essential that the strip ends should be accurately butted, and difficulty has been experienced, especially with thick metal strip, in achieving this. A feature of almost all commercially available metal strip which exaggerates this difficulty is that the strip, when drawn off the storage coil, is curved, in that the longitudinal edges of the strip, as it is drawn off the coil, do not remain straight and truly at right angles to the axis of the storage coil. Consequently when this strip is fed by pinch rolls from the shearing position to the welding position the lateral position of the cut edge varies with the amount of curve per unit length of the strip, and since this varies from coil to coil the accurate butting of such strips in the above described process raises many problems. Attempts to correct this horizontal variation of the position of the strip edge to be welded by altering the position of side guides have not been successful with thicker strips, chiefly because pressure on the edge of the strip causes it to twist out of the horizontal plane.

According to the present invention, a method of positioning a strip of metal relative to a welding head in a strip welding line comprises gripping the opposite surfaces of the strip between the jaws of a manipulating clamp, traversing the clamp transversely to the true direction of travel of the strip the amount necessary to correctly position the strip end laterally with respect to the welding head, and translating the clamp parallel to the true direction of travel of the strip until the strip is correctly placed in the welding position.

By "the true direction of travel of the strip" is meant the direction of travel of the strip after it has been welded when it is being fed from an uncoiling reel onto a final coiling reel. This direction is parallel to the line joining the centres of the various units forming the strip welding line, and the individual units are arranged along this line with the axes of the pinch rolls, supporting rollers, and flattening rolls at right angles to it.

Also according to the present invention, apparatus for positioning a strip of metal relative to a welding head in a strip welding line comprises a manipulating clamp having jaws adapted to grip the opposite surfaces of the metal strip, traversing means adapted to traverse the clamp transversely to the true direction of travel of the strip, and translating means adapted to move the clamp along a line parallel to the true direction of travel of the strip.

According to another feature of the invention, a strip welding line for preparing, positioning and welding together the ends of two metal strips which are fed longitudinally to a welding head comprises a welding head adapted to traverse the butted metalstrips, two shear units of opposite sense situated on the line of travel of the metal strips on opposite sides of the welding head, two manipulating clamps, each situated on the further side of a shear unit from the welding head and each adapted to grip one of the strips to traverse it transversely to the true direction of travel of the strip and to translate it parallel to the true direction of travel of the strip through a predetermined distance to the welding position, and two strip manipulating units, each situated on the further side respectively of the manipulating clamps from the welding head and each adapted to manipulate one of the strips to provide an excess loop of strip which may deform to allow movement of the strip end by the manipulating clamp.

According to yet another feature of the invention, the translating means adapted to move the manipulating clamp along a line parallel to the true direction of travel of the strip may include means for effecting this movement through a predetermined distance equal to the distance between the appropriate shear blade and the welding head. In a modification, when it is desired to leave a small e.g. (½₂ inch to ¼ inch) gap between the butting ends of the strip to facilitate welding of thicker strips i.e. those approaching ¼ inch in thickness, the means for effecting a movement of the manipulating clamp through a predetermined distance may be provided with an adjusting member such as a stop operated by set-screw so that the predetermined distance travelled by the manipulating clamp may be slightly reduced to leave the required gap betweeen the strips.

According to a further feature of the invention, the traversing means adapted to traverse the manipulating clamp transversely to the true direction of travel of the strip may be provided with a datum marker, so located that when the traversing means is operated to bring the strip into a predetermined relation with the datum marker, a subsequent translational movement alone will bring the strip end accurately into the welding position.

The invention will now be described by way of example with reference to the four figures of the accompanying drawings in which:

FIGURES 1 and 2 are a diagrammatic plan view and elevation respectively of a strip welding line, and FIGURES 3 and 4, drawn to a larger scale, show front and side elevations respectively of one construction of manipulating clamp which may be used in this strip welding line.

Referring to FIGURES 1 and 2 of the drawings, the strip welding line is intended for welding together the ends of coils of metal strip several feet in width and includes the following units arranged in a generally horizontal line in the following order:

An uncoiler 1 including a support frame 2 and at least one horizontal axle 3 on which one or more coils of strip may be supported;

A strip flattener or straightener 5 which comprises several rollers 6 to which an adjustable pressure may be applied and between which the strip passes;

A strip manipulating unit 7 which comprises one or more strip raising or lowering rolls 8 mounted on a vertically movable pillar 9 and which may be actuated to provide a free loop of strip to allow sideways movement of the strip as will be described in more detail later;

A manipulating clamp 10 having inlet guide rollers 11 for the strip, and two horizontally arranged jaws, shown in FIGURES 3 and 4, which may grip the top and bottom surfaces of the strip and which may be moved, for example by lead screw or hydraulic rams, in two directions, one a translational movement A parallel to the true direction of motion of the strip, and one a traverse B transversely of the strip, in order to position the strip transversely of the shear unit and then to move the cropped end of the strip accurately into the welding position;

A shear unit 12 provided with inlet guide rollers 13 and, in conventional manner, with two co-operating shear blades (not shown) one vertically movable and one fixed, for cropping the end of the strip to prepare it for welding;

And a welding jig and welding head unit 14 arranged to grip the strip ends in the welding position and to weld them together by traverse of the welding head 15 across the strip. When the rearmost end of one strip is to be welded to the leading end of a second strip the units just described operate to prepare and position the leading end of the second strip for welding.

To prepare and position the rearmost end of the first strip for welding further units are disposed beyond the welding jig and welding head unit 14. These units are a second shear unit 16 which is similar to the shear unit 12 except that the shear blades operate in the opposite sense as explained below;

a manipulating clamp 17 similar to manipulating clamp 10;

a strip manipulating unit 18 similar to strip manipulating unit 7;

and a final coiling unit 19.

Sets of driven pinch rolls (not shown) may be arranged at intervals along the strip welding line in conventional manner to feed the strips towards the welding position as required. The uncoiler 1 and final coiling unit 19 are arranged to be driven by electric motors 20 and 21 respectively. Control switches for all these drives, as well as the controls of the various units are located on a central control panel 22 seen in FIGURE 1 only.

The shear blades used in the shear units 12 and 16 are of opposite sense, and by this is meant that if the first unit has an up-cut action with the moving blade located nearer to the welding head than the stationary blade, then the second unit has an up-cut action and also has the moving blade located nearer to the welding head than the stationary blade. The reason for this arrangement is that the cut ends of the strips when so cut are more likely to butt together accurately for arc welding than if cut by shear units of the same sense. Cutting both strips with a single cut after overlapping the strips has also been found to give a very unsatisfactory cut for butting purposes preparatory to arc welding.

The shear blades may be arranged at right angles to the true direction of travel of the strip, and welding head moved parallel to them in a horizontal plane to complete the weld. It is preferred however than the shear blades and the welding head motion are inclined between 75° and 90° to the true direction of travel of the strip, for example 80° as shown in FIGURE 1. This is because the increased load on any subsequent thickness reducing rollers (not shown) due to the weld bead passing through them is most severe when the whole width of the weld bead passes through at once. When the weld bead is at a slight angle, as suggested above, this wear-producing load on the rollers is reduced.

In FIGURES 3 and 4 of the drawings is shown one construction of manipulating clamp for incorporation in the strip welding line of FIGURES 1 and 2 at 10 and 17. This manipulating clamp has a chassis 30, supported on rollers 31, which is movable on the guideway 32 parallel to the true direction of travel of the strip. This translational movement of the chassis is obtained by actuation of a hydraulic ram 33 which is connected between the chassis 30 and a fixed point such as one of the rigidly mounted strip manipulating units 7 and 18. The translational movement of the chassis 30 is arranged to be equal to the distance moved by a cropped end of the strip in moving to the welding position from the shear units. In many cases this distance will be exactly equal to the distance from the shearing line to the line traversed by the welding head. Slight adjustment of this distance may be made by means of an adjustable stop 34 for the chassis 30. Alternatively the effective length of the hydraulic ram 33 may be adjustable.

Mounted for transverse movement on the chassis 30 is a clamping frame 35 having spaced vertical pillars 36 supporting a stationary clamping jaw 37 and guide rollers 38. A movable clamping jaw 39 guided by the pillars 36 is vertically movable by means of a hydraulic ram 40 and may be raised to clamp the strip against the jaw 37. Transverse movement of the clamping frame 35 on the chassis 30 is obtained by energising an electric motor 41 which is coupled by a driving chain 42 to a lead screw 43 engaging in a captive nut (not shown) secured to the chassis. The clamping frame is supported on wheels 44 which move in slots 45 in the chassis.

Operation of the strip welding line will now be described with reference to all of the drawings. A coil of strip is led off the uncoiler 1 through all of the units and mostly coiled on the final coiling unit 19, the rearmost end of this strip being roughly positioned on the welding head side of the shear unit 16, and the jaws 37 and 39 of the manipulating clamp 17 operated to clamp the strip in that position. A second coil of strip is then fed off the uncoiler 1 until the leading end of this coil is roughly positioned on the welding head side of shear unit 12. The jaws of manipulating clamp 10 are closed on the second strip. The strip raising rolls of the strip manipulating units 7 and 18 are then raised and lowered to provide loops of relatively unconstrained strip which may deform comparatively easily.

If the longitudinal edges of the two strips extending through the shear units 12 and 16 are then in alignment it is possible to position the strips for welding merely by advancing the manipulating clamps 10 and 17 along the guideway 32 towards the welding jig and welding head unit 14 by means of the hydraulic ram 33. The cropped ends of the two strips will then be in close abutment or will be spaced apart, depending upon the adjustment of the adjustable stop 34.

In many cases, however, the longitudinal edges will not be in alignment, and one or both of the strips have to be moved sideways until they are aligned with a datum line on their shear unit. Thus supposing that the longitudinal edges of the second strip are incorrectly aligned in the shear unit 12, the jaws 37 and 39 are moved transversely of the true direction of travel of the strip until correct alignment is obtained. This alignment may be checked visually or automatically at the shear unit 12, or in certain cases by comparing the position of the jaws 37 and 39 with a datum line.

Referring to FIGURES 3 and 4, it will be appreciated that transverse movement of the jaws 37 and 39 is obtained by driving the clamping frame 35 relatively to the chassis 30. A datuum line on the chassis can be used for positioning the jaws 37 and 39 in the correct position for alignment of the second strip in the shear unit 12. After the strip has been correctly positioned the shear unit 12 is operated, and the cropped end of the strip is advanced to the welding position by the translational movement of the manipulating clamp 10 produced by the hydraulic ram 33.

The rearmost end of the first strip is also handled in similar manner by the manipulating clamp 17 and shear unit 16, and brought exactly into the welding position. This handling of the two strips can take place simultaneously or in turn. The ends of the two strips can be accurately and closely butted on a line inclined at 80° to the direction of travel of the strip, or, with thicker strips, may be spaced to leave a slight gap. Welding is effected by means of the welding head 15, which is preferably an electric arc welding head but could alternatively be an electric resistance welding head, and which is moved along the butted ends of the strips. After welding, the jaws of the manipulating clamps 7 and 17 are separated and these clamps are moved away from the welding head to their starting positions. The final coiling unit 19 is then operated to draw the continuous length of strip through the units and into a single coil.

I claim:

1. A method of positioning a strip of metal relative to a welding head in a strip welding line comprising gripping the opposite surfaces of the strip between the jaws of a manipulating clamp, traversing the clamp transversely to the true direction of travel of the strip the amount necessary to correctly position the strip end laterally with respect to the welding head, and translating the manipulating clamp parallel to the true direction of travel of the strip until the strip is correctly placed in the welding position.

2. A strip welding line for preparing, positioning and welding together the ends of two metal strips which are fed longitudinally to a welding head comprising a welding head adapted to traverse the butted metal strips, two shear units of opposite sense situated on the line of travel of the metal strips on opposite sides of the welding head, two manipulating clamps, each situated on the further side of a shear unit from the welding head and each adapted to grip one of the strips to traverse it transversely to the true direction of travel of the strip and to translate it parallel to the true direction of travel of the strip through a predetermined distance to the welding position, and two strip manipulating units, each situated on the further side respectively of the manipulating clamps from the welding head and each adapted to manipulate one of the strips to provide an excess loop of strip which may deform to allow movement of the strip end by the manipulating clamp.

References Cited by the Examiner

UNITED STATES PATENTS

| | | | |
|---|---|---|---|
| 233,952 | 11/80 | Taylor | 269—55 |
| 2,120,316 | 6/38 | Stone | 113—123 |
| 2,203,151 | 6/40 | Iversen | 113—123 |
| 2,222,168 | 11/40 | Brooks | 226—143 |
| 2,416,861 | 3/47 | Woodbury | 269—58 |
| 2,782,488 | 2/57 | Anderson | 113—123 |
| 3,057,056 | 10/62 | Foley et al. | 113—123 |

FOREIGN PATENTS 653,710  5/51  Great Britain.

CHARLES W. LANHAM, *Primary Examiner.*

JOHN F. CAMPBELL, *Examiner.*